O. C. GLYNN.
Darning-Lasts.
No. 147,765.             Patented Feb. 24, 1874.
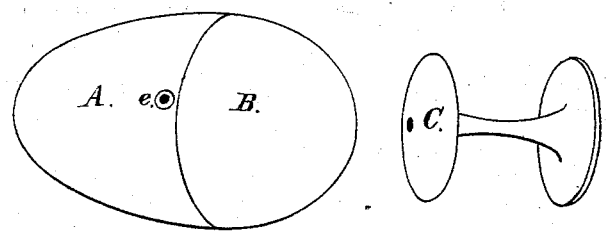

UNITED STATES PATENT OFFICE.

ORSAMUS C. GLYNN, OF NEW HAVEN, CONNECTICUT, ASSIGNOR OF ONE-HALF HIS RIGHT TO JOHN C. THOMPSON, OF SAME PLACE.

IMPROVEMENT IN DARNING-LASTS.

Specification forming part of Letters Patent No. 147,765, dated February 24, 1874; application filed January 19, 1874.

*To all whom it may concern:*

Be it known that I, ORSAMUS C. GLYNN, of the city and county of New Haven and State of Connecticut, have invented a new and Improved Implement for Darning Stockings; and I do hereby declare that the following is a full and exact description thereof, reference being had to the accompanying drawing and to the letters of reference marked thereon, making a part of this specification:

The object of my invention is to make an implement of suitable form for the purpose, and, by making it hollow, to provide room for a spool for holding the yarn to be used within the implement itself.

To this end I construct the implement in two parts, A and B, which are fitted together and made hollow, as shown in Figs. 3 and 4. It is also provided with the spindle D attached to one end of the implement, on which the spool C, shown in Fig. 2, is free to turn. This spindle may also be made tight on the spool and project beyond its ends and turn in holes drilled into the ends of the two parts A and B, or be otherwise pivoted.

The implement may be made of wood, metal, hard rubber, *papier-maché*, or any suitable material, and the two parts A and B may be hinged together or fitted together, as shown in the model. It is also made with the perforation e, through which the yarn is drawn out as required.

I claim—

As a new article of manufacture, the egg-shaped hollow implement made in two parts, A and B, with the perforations e, in combination with the spool C and spindle D, as and for the purpose set forth.

ORSAMUS C. GLYNN.

Witnesses:
    GEORGE TERRY,
    JULIUS TWISS.